United States Patent [19]

Miyazaki et al.

[11] Patent Number: 4,929,257

[45] Date of Patent: May 29, 1990

[54] ABRASIVE COMPOSITION AND PROCESS FOR POLISHING

[75] Inventors: Kunihiro Miyazaki; Ken Ishitobi, both of Shiojiri; Yosinobu Yamaguchi, Nagoya, all of Japan

[73] Assignees: Showa Denko Kabushiki Kaisha, Tokyo; Yamaguchi Seiken Kogyo Kabushiki Kaisha, Aichi, both of Japan

[21] Appl. No.: 330,581

[22] Filed: Mar. 30, 1989

[30] Foreign Application Priority Data

Apr. 8, 1988 [JP] Japan ............................ 63-86490

[51] Int. Cl.$^5$ ............................................. B24D 3/02
[52] U.S. Cl. ....................................... 51/309; 51/293; 51/303; 106/3
[58] Field of Search ................. 51/293, 303, 309; 106/3

[56] References Cited

U.S. PATENT DOCUMENTS

| | | | |
|---|---|---|---|
| 4,226,623 | 10/1980 | Koshiyama et al. | 51/309 |
| 4,358,295 | 11/1982 | Namba et al. | 51/309 |
| 4,451,269 | 5/1984 | Makedomski et al. | 51/303 |
| 4,645,561 | 2/1987 | Rea | 51/309 |
| 4,696,697 | 9/1987 | Kitano et al. | 51/309 |
| 4,705,566 | 11/1987 | Senda et al. | 51/309 |
| 4,769,073 | 9/1988 | Tastu et al. | 51/309 |
| 4,853,000 | 8/1989 | Potter | 51/309 |

FOREIGN PATENT DOCUMENTS 61-278587 12/1986 Japan .

Primary Examiner—Paul Lieberman
Assistant Examiner—Willie J. Thompson
Attorney, Agent, or Firm—Sughrue, Mion, Zinn, Macpeak & Seas

[57] ABSTRACT

An abrasive composition comprising: an aluminous abrasive, preferably having an average particle size of 0.5–10 μm and a concentration of 1 to 25% by weight; nickel sulfamate and/or sulfate, preferably having a concentration of 0.5 to 10% by weight; magnesium nitrate, preferably having a concentration of 0.1 to 12% by weight and water, the composition preferably having a pH of 4 to 7. This abrasive composition produces a superior effect, particularly a reduction of protrusions and pits and deep scratches when used for polishing an aluminum-based substrate for a magnetic recording disc.

15 Claims, No Drawings

ABRASIVE COMPOSITION AND PROCESS FOR POLISHING

BACKGROUND OF THE INVENTION

1. The present invention relates to an abrasive composition. More particularly, the present invention relates to an abrasive composition for rapidly polishing and providing a mirror finish to an aluminum-based substrate for a magnetic recording disc, and a process therefor.

2. Description of the Related Art

A magnetic recording disc comprises an aluminum-based substrate including an aluminum or aluminum alloy (referred to only as aluminum hereafter) disc, a nickel substrate formed by plating nickel-phosphine onto an aluminum disc, and an anodized aluminum substrate formed by anodizing an aluminum disc. A magnetic film is applied to the aluminum-based substrate by coating, plating or sputtering, and the surface of the aluminum-based substrate is provided with a mirror-finish by polishing or lapping.

A known weak acid abrasive composition used for polishing an aluminum substrate for a magnetic recording disc is an aqueous slurry containing an aluminous abrasive and an abrasion accelerator of nickel sulfate (H. Kitano et al., Japanese Unexamined Patent Publication (Kokai) No. 61-278587, published on Dec. 9, 1986). A weak acid to neutral abrasive composition is also provided, which is an aqueous slurry containing an aluminum abrasive and nickel sulfamate (Japanese Pat. Application No. 62-253591, field on Oct. 9, 1987).

Due to recent demands for a denser recording on a magnetic recording disc, the alumina-based substrate requires a finer polished surface with fewer pits, protrusions and scratches, but the above abrasive compositions may easily cause protrusions or pits and deep scratches, particularly when polishing an aluminum substrate plated with nickel-phosphine, under normal conditions.

Therefore, the main object of the present invention is to provide an abrasive composition by which a finer mirror-like surface with few protrusions or pits and few deep scratches is obtained at a high efficiency.

SUMMARY OF THE INVENTION

The inventors assumed that protrusions and pits are formed due to an improper chemical action of the abrasion accelerator, and polished nickel substrate with known abrasive compositions to which were added various water-soluble aluminum or magnesium compounds. As a result, the inventor found that magnesium nitrate is remarkably effective in improving the fineness of the polished surface, and thus created the present invention.

Accordingly, the present invention provides a weak acid or neutral abrasive composition particularly suitable for polishing an aluminum-based substrate for a magnetic recording disc and comprising an aluminous abrasive, a polishing accelerator of nickel sulfamate and/or sulfate, a surface modifying agent of magnesium nitrate, and water.

DESCRIPTION OF THE PREFERRED EMBODIMENTS

The aluminous abrasive used in this invention is known and commercially available, and includes $\alpha$-aluminum oxide ($\alpha$-$Al_2O_3$), prepared, for example, by calcining particulate boemite [$Al_2O_3 \cdot H_2O$, $AlO(OH)$] and crushing the resultant $\alpha$-$Al_2O_3$. The aluminous abrasive preferably has an average particle size of 0.5-10 $\mu$m, more preferably 0.8-4 $\mu$m. If the average particle size of the abrasive is lower than 0.5 $\mu$m, the abrasion efficiency is lowered, and if the average particle size of the abrasive is larger than 10 $\mu$m, the finished surface of the substrate is rough. The aluminous abrasive is preferably present in an amount of 1-25% by weight, more preferably 5-10% by weight, of the total weight of the abrasive composition. If the amount of the abrasive is less than 1% by weight, the abrasion efficiency is lowered and scratches appear, and if the amount of the abrasive is more than 25% by weight, the abrasion efficiency is not increased since the workability is reduced due to an increased viscosity of the composition.

The nickel sulfamate $Ni(NH_2SO_3)_2 \cdot 4H_2O$ and/or nickel sulfate $NiSO_4$ used are/is preferably added in an amount of 0.5-10% by weight, more preferably 1-5% by weight, of the total weight of the abrasive composition. More than 0.5% by weight of the nickel sulfamate is necessary to obtain an effective abrasion efficiency and reduce scratches, but more than 10% by weight of the nickel sulfamate and/or sulfate generally do not further increase the abrasion efficiency, and thus is a waste of the material.

The magnesium nitrate used has an effect of reducing surface defects such as protrusions, pits and scratches, and allows a finer polished surface to be rapidly obtained. THe magnesium nitrate is advantageously less corrosive to machine parts and less harmful to humans. The magnesium nitrate is preferably added in an amount of 0.1% to 12% by weight of the total weight of the composition. Less than 0.1% by weight of the magnesium nitrate does not provide a sufficient prevention of protrusions or pits, and more than 12% by weight of the magnesium nitrate does not provide any additional effects and results in a reduction of the polishing efficiency. 0.1% to 5% by weight thereof is most preferable.

Preferable magnesium nitrate is added together with crystalline cellulose, as this enhances the effect of reducing protrusions and pits. The crystalline cellulose comprises powders of a crystalline portion of a high purity refined pulp obtained by hydrolyzing the high purity refined pulp with a mineral acid to clean away and remove noncrystalline portions, followed by grinding, cleaning and drying. The crystalline cellulose improves the retention of an aluminous abrasive on a polishing pad during polishing, whereby the abrasion effect is improved. The appropriate amount added of the crystalline cellulose is up to 1% by weight of the total weight of the composition, preferably 0.1% to 1% by weight. Less than 0.1% by weight of the crystalline cellulose does not have a significant effect and more than 1.0% by weight an adverse causes formation of pits.

Preferably, the abrasive composition has a pH of from 4 to 7, i.e., a weak accidity to a neutral state. If necessary, sulfamic or sulfuric acid, etc., may be added to the composition to obtain a desired pH, or for other purposes.

The abrasive composition according to the present invention can be thickly concentrated, as this is advantageous for storage and transportation, and even necessary for specific usages. For example, a thick composition containing 15-25 wt% of aluminous abrasive is preferable for production or storage. Such a thick composition can be used for polishing either without dilution or when diluted with about 1 to 5 times the equivalent amount of water.

The abrasive composition may be prepared, for example, by adding and mixing nickel sulfamate and/or sulfate together with magnesium nitrate, and optionally, with crystalline cellulose, to an aqueous slurry of an aluminous abrasive.

The abrasive composition of the present invention is particularly suitable for polishing an aluminum-based substrate for a magnetic recording disc. Such an aluminum-based substrate includes, for example, 1) an aluminum or aluminum-alloy substrate (referred to only as "aluminum substrate" hereafter), 2) an aluminum substrate plated with nickel-phosphine or nickel-boron, e.g., by electroless plating, 3) an anodized aluminum substrate, and 4) an aluminum substrate treated with a chromate. A magnetic layer is applied to these aluminum-based substrates by coating, plating, or sputtering, etc.

Other materials which can be polished with the abrasive composition of the present invention include metals other than aluminum, synthetic resins.

The substrate may be polished with the abrasive composition by a conventional technique.

The abrasive composition according to the present invention provides a workpiece with a finer finished surface having far fewer scratches and an insignificant surface roughness, at a higher efficiency. The abrasion composition has a further advantage in that is less corrosive to machinery and less harmful to the human body.

The invention is further described by way of examples. In the Examples, the polishing characteristics of the abrasive compositions were determined by the following polishing test.

Namely, the polishing was conducted by using a four-way both-side polishing machine having surface plates 640 mm in diameter. Suede-type pads (Chiyoda K.K. D' tex 25-3) were attached to the surface plates, and ten (10) aluminum-based discs having 20 $\mu$m thick nickel-phosphine plated layers on both sides thereof and having a diameter of 3.5 inches were mounted on the polishing machine and polished for 6 minutes. The polishing conditions were a rotation speed of the lower surface plate of 70 rpm, a working pressure of 100 g/cm$^2$, and a slurry su-ply of 100 ml/min. After polishing, the aluminum-based disc was weighed and the polishing rate was determined from the loss in weight of the disc. The surface of the disc was observed by a differential interference microscope and a 100,000 lux spot light and the degree of scratching, etc., was determined. The surface roughness was measured by a Talystep and Talydata 2000 model manufactured by Rank Taylor Hobson Company.

EXAMPLE 1 (COMPARATIVE)

A comparative abrasive composition was prepared by dissolving nickel sulfamate [Ni(NH$_2$SO$_3$)$_2$.4H$_2$O] in an aqueous slurry of 20% by weight (alumina ($\mu$-Al$_2$O$_3$)) abrasive having an average size of 1.4 $\mu$m, the amount of the nickel sulfa being 4.2% by weight, followed by adding sulfamic acid to adjust the pH of the compositions to 5.7.

Using the abrasive composition diluted three times in volume with pure water, the polishing test of the nickel-phosphine plated aluminum-based discs was carried out.

The results of the test are shown in Table 1.

EXAMPLE 2 to 4

Magnesium nitrate Mg(NO$_3$)$_2$.6H$_2$O was dissolved in the abrasive composition in Example 1, amounts of 0.5%, 1.0% and 5.0% by weight of the total weight of the compositions, respectively, and the thus obtained abrasive compositions according to the present invention were diluted 3 times in volume with pure water, and the polishing tests carried out.

The results are shown in Table 1.

EXAMPLE 5 (COMPARATIVE)

In the abrasive composition containing 1.0% by weight of magnesium nitrate, obtained in Example 2, was dissolved 0.1% by weight of crystalline cellulose to obtain an abrasive composition according to the present invention. The obtained abrasive composition was diluted three times by volume with pure water, and the polishing test was carried out.

The results are shown in Table 1.

EXAMPLE 6 (COMPARATIVE)

Aluminum nitrate Al(NO$_3$)$_3$.9H$_2$O was added in an amount of 0.5% by weight of the total composition to the abrasive composition obtained in Example 1. This abrasive composition was diluted three times by volume with pure water, and the polishing test was carried out.

The results are shown in Table 1.

EXAMPLE 8 (COMPARATIVE)

In the abrasive composition obtained in Example 1, was dissolved aluminum sulfate Al$_2$(SO$_4$)$_3$.18H$_{20}$ in an amount of 0.5% by weight of the composition. This abrasive composition was diluted three times by volume with pure water, and the polishing test was carried out.

The results are shown in Table 1.

EXAMPLE 8 (COMPARATIVE)

A comparative abrasive composition was prepared by dissolving 4.2% by weight of nickel sulfamate in an aqueous slurry of 20% by weight (alumina ($\mu$-Al$_2$O$_3$)) abrasive having an average particle size of 1.4 $\mu$m, followed by adding sulfamic acid to adjust the pH of the slurry to 5.2. This abrasive composition was diluted three times by volume with pure water. Using this diluted abrasive composition, the polishing test of the nickel-phosphine-plated aluminum-based discs was carried out.

The results are shown in Table 1.

TABLE 1

|  |  | Polishing accelerator | Additive (wt %)** | pH | Polishing rate ($\mu$m/min) | Surface roughness Rtm (Å) | Protrusion and pits*** |
|---|---|---|---|---|---|---|---|
| Present invention | Ex. 2 | Nickel sulfamate | Magnesium nitrate 0.5 | 5.9 | 1.28 | 207 | Less than one in ten views at 350 magnitude. |

TABLE 1-continued

|  |  | Polishing accelerator | Additive (wt %)** | pH | Polishing rate (μm/min) | Surface roughness Rtm (Å) | Protrusion and pits*** |
|---|---|---|---|---|---|---|---|
|  | Ex. 3 | Nickel sulfamate | Magnesium nitrate 1.0 | 6.0 | 1.32 | 210 | Less than one in ten views at 350 magnitude. |
|  | Ex. 4 | Nickel sulfamate | Magnesium nitrate 5.0 | 6.1 | 1.26 | 215 | Less than one in ten views at 350 magnitude. |
|  | Ex. 5 | Nickel sulfamate | Magnesium nitrate 1.0 + Crystalline cellulose 0.1 | 6.0 | 1.32 | 193 | Little observed |
| Comparative | Ex. 1* | Nickel sulfamate | — | 5.7 | 1.30 | 230 | More than one in one view at 350 magnitude |
|  | Ex. 6* | Nickel sulfamate | Aluminium nitrate 0.5 | 3.9 | 1.30 | 211 | More than one in one view at 350 magnitude |
|  | Ex. 7* | Nickel sulfamate | Aluminium sulfate 0.5 | 3.8 | 1.31 | 227 | More than one in one view at 350 magnitude |

Note
*Examples 1, 6 and 7 were comparative.
**The content of the additive is that before dilution with water.
***Protrusions and pits were observed by differential interference microscope.

As shown in Table 1, the abrasive compositions containing magnesium nitrate attain polishing rates almost equal to those obtained by the abrasion compositions containing no magnesium nitrate, but allow less protrusions and pits by one tenth, as shown by observation of the polished surfaces by differential interference microscope. When crystalline cellulose was added together with magnesium nitrate, few protrusions or pits were observed, which demonstrate a great improvement. Further, it was observed that the abrasive compositions containing magnesium nitrate allowed a finer surface roughness and fewer and narrower and shallower scratches.

The additives of aluminum nitrate and sulfate used in Example 6 and 7 did not provide the compositions with any advantageous effect.

EXAMPLE 9

Magnesium nitrate was dissolved in the abrasive composition obtained in Example 8, in an amount of 1.0% by weight of the composition. This abrasive composition was diluted three times by volume with pure water, and the polishing test was carried out.

The results are shown in Table 2.

EXAMPLE 10

Crystalline cellulose was dissolved in the abrasive composition obtained in Example 5, in an amount of 1.0% by weight of the composition. The resultant abrasive composition was diluted three times by volume with pure water, and the polishing test was carried out. The results are shown in Table 2.

TABLE 2

|  |  | Polishing accelerator | Additive (wt %)** | pH | Polishing rate (μm/min) | Surface roughness Rtm (Å) | Protrusion and pits*** |
|---|---|---|---|---|---|---|---|
| The present invention | Ex. 9 | Nickel sulfate | Magneium nitrate 1.0 | 5.3 | 1.18 | 212 | Less than one in ten views at 350 magnitude. |
|  | Ex. 10 | Nickel sulfate | Magnesium nitrate 1.0 + Crystalline cellulose 0.1 | 5.3 | 1.18 | 203 | Little observed |
| Comparative | Ex. 8* | Nickel sulfate | — | 5.2 | 1.16 | 240 | More than one in one view at 350 magnitude |

Table 2, wherein nickel sulfate was used instead of nickel sulfamate as a polishing accelerator, shows that the magnesium nitrate is also effective in such compositions.

Thus, the abrasive composition, according to the present invention has the following advantageous, when compared with an abrasive composition without magnesium nitrate:
(i) Substantially no protrusions or pits;
(ii) Substantially no deep scratching;
(iii) Lower surface roughness;
(iv) Uniform high grade surface;
(v) Less corrosive to machinery;
(vi) Less harmful to the human body.

We claim:
1. A weak acid or neutral abrasive composition comprising an alpha alumina, a polishing accelerator of nickel sulfamate and/or sulfate, a surface modifying agent of about 0.1 to about 12% by weight of the composition magnesium nitrate, and water.
2. A composition according to claim 1, wherein the composition has a pH of 4 to 7.

3. A composition according to claim 1, wherein the nickel sulfamate and/or sulfate is contained in an amount of 0.5% to 10% by weight of the composition.

4. A composition according to claim 1, wherein the alpha alumina is contained in an amount of 1% to 25% by weight of the composition and has an average particle size of 0.5 μm to 10 μm.

5. A composition according to claim 1, further comprising a crystalline cellulose in an amount of up to 1% by weight of the composition.

6. A composition according to claim 1, for polishing an aluminum-based magnetic-recording-disc substrate, wherein the alpha alumina has an average particle size of 0.5 μm to 10 μm and is contained in an amount of 1% to 25% by weight of the composition, and the nickel sulfamate and/or sulfate is contained in an amount of 0.5% to 10% by weight of the composition.

7. A composition according to claim 6, further comprising crystalline cellulose in an amount of up to 1% by weight of the composition.

8. A process for polishing a workpiece comprising contacting said workpiece with a weak acid or neutral abrasive composition comprising an alpha alumina, a polishing accelerator of nickel sulfamate and/or sulfate, a surface modifying agent of about 0.1 to about 12% by weight of the composition magnesium nitrate, and water.

9. A process according to claim 8, wherein the workpiece is a substrate for a magnetic recording disc, made of aluminum or an aluminum alloy.

10. A process according to claim 9, wherein the substrate is plated with nickel-phosphine.

11. A process according to claim 9, wherein the substrate is anodized.

12. A process according to claim 8, wherein the the composition has a pH of 4 to 7.

13. A process according to claim 8, wherein the nickel sulfamate and/or sulfate is contained in an amount of 0.5% to 10% by weight of the composition.

14. A process according to claim 8, wherein the aluminous abrasive is contained in an amount of 1% to 25% by weight of the composition and has an average particle size of 0.5 μm to 10 μm.

15. A process according to claim 8, wherein the abrasive composition further comprises crystalline cellulose in an amount of up to 1% by weight of the composition.

* * * * *